United States Patent [19]

Takagi

[11] Patent Number: 4,588,038

[45] Date of Patent: May 13, 1986

[54] LOAD WEIGHT MEASURING METHOD

[75] Inventor: Kazuo Takagi, Hiratsuka, Japan

[73] Assignee: Kabushiki Kaisha Komatsu Seisakusho, Tokyo, Japan

[21] Appl. No.: 705,883

[22] Filed: Feb. 26, 1985

[51] Int. Cl.$^4$ .................. G01G 19/10; G01G 23/14; G01G 5/04

[52] U.S. Cl. .................................. 177/141; 177/165; 177/209

[58] Field of Search ................ 177/141, 165, 209

[56] References Cited

U.S. PATENT DOCUMENTS 4,007,894 2/1977 Hartel .......................... 177/141 X
4,456,084 6/1984 Miller ............................ 177/141

Primary Examiner—George H. Miller, Jr.

Attorney, Agent, or Firm—Spensley Horn Jubas & Lubitz

[57] ABSTRACT

In a measuring method of a load weight carried by a vehicle wherein the load weight is measured by subtracting the weight of vehicle when the vehicle is empty from the weight of the vehicle when it is loaded, the load weight being supported by suspension cylinders of the vehicle, it is adapted to measure the weight of the vehicle when it is loaded and/or the weight of the vehicle when it is empty by the steps of detecting pressures in all suspension cylinders sequentially during a given period of time while the vehicle is vibrating, calculating the weights applied to all the suspension cylinders based on the detected pressures and the cross-sectional area of the cylinders, and obtaining an average value of the calculated weight at the given period of time.

5 Claims, 7 Drawing Figures

LOAD WEIGHT MEASURING METHOD

BACKGROUND OF THE INVENTION

1. Field of the Invention

The present invention relates to a method for measuring a weight of a load carried by a vehicle, typically dump trucks, the body weight of which is supported by suspension cylinders.

2. Description of the Prior Art

In a prior art measuring method a weight of a load carried by such vehicles (hereinafter called load weight) with a vehicle bearing type weighing instrument, typically a platform weighing machine, the weight of an empty vehicle is subtracted from the weight of a loaded vehicle to obtain the load weight. In the measurement of the above loaded vehicle weight and the empty vehicle weight, the weight applied to each suspension cylinder is obtained as a product of the pressure in the suspension cylinder and the cross-sectional area of the cylinder, and the weight of the loaded or empty vehicle is obtained from the total value of weights applied to four suspension cylinders. Of course, this measurement is performed with the suspension cylinders in the stationary state.

The load weight measurement by the above-mentioned prior art method has produced measurement errors around ±25% at the maximum due to the effects of sliding resistance of the piston cylinder of the suspension cylinder and a longitudinal tilt of the vehicle body.

Since vehicles such as dump trucks are mostly used for transporting rocks, ores, etc., to know the weight of load accurately is very important for preventing vehicle damage due to overloading as well as performing the control of the amount of products.

SUMMARY OF THE INVENTION

The object of the present invention is to provide a measuring method of weight of a load carried by a vehicle capable of measuring the load weight accurately by removing the effects of sliding resistance of the piston cylinder in the suspension cylinder supporting the vehicle and the tilt of the vehicle body.

To achieve the above object, in the measuring method of a load weight of vehicles wherein the load weight is measured by subtracting the weight of vehicle when the vehicle is empty from the weight of the vehicle when it is loaded, the load weight being supported by suspension cylinders of the vehicle, it is adapted to measure the weight of the vehicle when it is loaded or the weight of the vehicle when it is empty by the steps of detecting pressures in all suspension cylinders sequentially during a given period of time while the vehicle is vibrating, calculating the weights applied to all the suspension cylinders based on the detected pressures and the cross-sectional area of the cylinders, and obtaining a mean value of the calculated weight at the given period of time.

DESCRIPTION OF THE PREFERRED EMBODIMENTS

The present invention will be described in detail with reference to the accompanying drawings.

Figure 1:
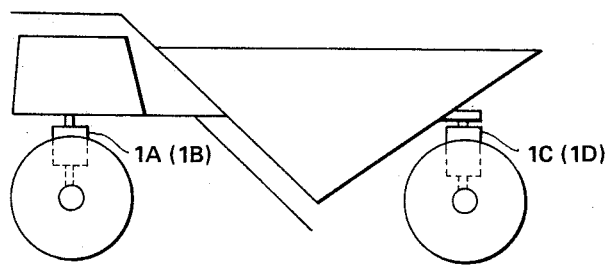
FIG. 1 is a schematic side view of a vehicle to which the method of the present invention is applied.

Firstly, suspension cylinders will be described briefly. The suspension cylinder is a hydropneumatic suspension having spring (resilient) and damping properties. As shown in FIG. 1, for suspension cylinders 1A, 1B, 1C, and 1D are respectively provided for each of four wheels (two front wheels and two rear wheels) to support the weight of vehicle body.

Figure 2:
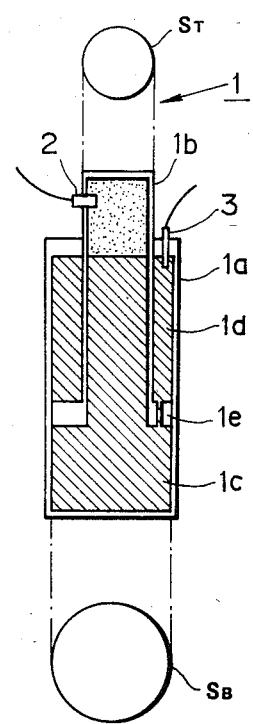
FIG. 2 is a sectional view showing the construction of a suspension cylinder.

FIG. 2 is a sectional view of a suspension cylinder 1 comprising a cylinder 1a and a piston cylinder 1b. The piston cylinder divides the interior of the cylinder 1a into an internal chamber 1c defined by the inner surface of the piston cylinder 1b and the cylinder 1a and an external chamber 1d defined by the outer surface of the piston cylinder 1b, and the cylinder 1a. The internal and external chambers 1c and 1d communicate with each other through an orifice 1e. These chambers are filled with oil and gas.

The weight of the vehicle body is obtained by measuring the weight carried by the four suspension cylinders 1A, 1B, 1C and 1D. Now, as shown in FIG. 2, when a weight W applies to the piston cylinder 1b of the suspension cylinder 1, the weight W can be given by the following equation.

$$= W = PB \times SB - PT(SB - BT) \pm F \quad (1)$$

where PB: bottom pressure, i.e., pressure in the internal chamber 1c,

PT: top pressure, i.e., pressure in the external chamber 1d

SB: cross-section area of the cylinder 1a

ST: cross-sectional area of the piston cylinder 1b

F: sliding resistance between the piston cylinder 1b and the cylinder inner wall When the suspension cylinder 1 is in the stationary state, the bottom pressure PB and the top pressure PT coincide. However, these pressures PB and PT do not coincide when the suspension cylinder 1 is in the moving state. The sliding resistance F cannot be measured.

Accordingly, in measuring the weight W, the bottom pressure PB and top pressure PT are detected by pressure sensors 2 and 3 respectively, and an apparent weight W' including the true weight W and the sliding resistance F is obtained by the following equation.

$$W' = PB \times SB - PT(SB - ST) \quad (2)$$

When the sliding resistance F acts upward, the relation between the apparent weight W' and the true weight W becomes as follows:

$$W' = W - F \quad (3)$$

On the other hand, when the sliding resistance F acts downward, the relation between W' and W becomes as follows:

$$W' = W + F \quad (4)$$

Figure 3:
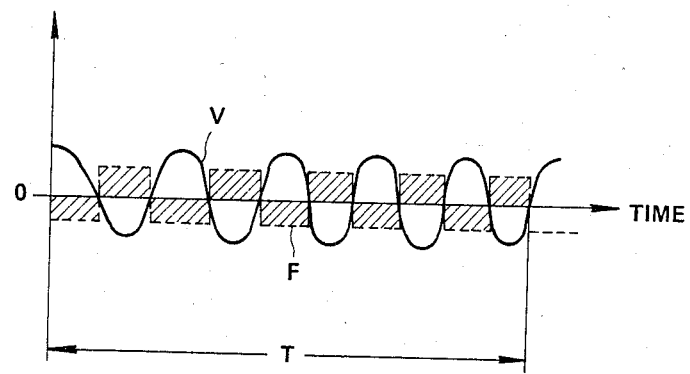
FIG. 3 is a graph showing the relationship between the velocity of sliding and sliding resistance used for illustrating the principle of the present invention.
Figure 4:
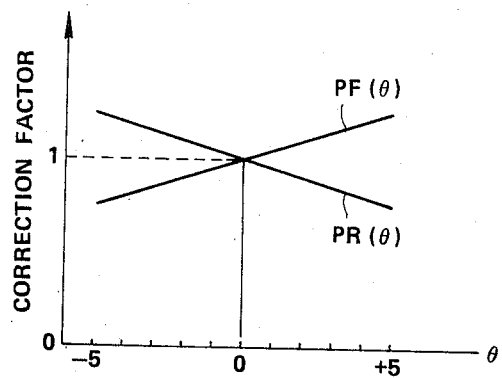
FIG. 4 is a graph showing a front wheel tilt correction factor and a rear wheel tilt correction factor against the longitudinal tilt angle of the vehicle body.

Now, the principle of the present invention will be described. When the suspention cylinder 1 is making a telescopic motion, the relation between a sliding velocity V of the suspension cylinder 1 and the sliding resistance F at that time becomes as shown in the graph of FIG. 3, and it is noted particularly that plus and minus values of the sliding resistance F appear repeating alternately. Accordingly, during a given period of time T when the suspension cylinder 1 is making the telescopic motion, if the apparent weight W' shown in Eq. (2) is integrated and then divided by time T, the sliding resistance F is cancelled, and the apparent weight W' becomes equal to the true weight W.

$$W = \frac{1}{T} \int_0^T W' dt \quad (5)$$

When the vehicle body tilts in the longitudinal direction under such situations, for example, where the vehicle body becomes higher at the front than at the rear, the weight applied to the front wheel suspension cylinders 1A and 1B becomes small compared with the situation where the vehicle body is horizontal, and the weight applied to the rear wheel suspension cylinders 1C and 1D becomes large. Accordingly, each of these weights applied to the front and rear wheel suspension cylinders 1A, 1B, 1C, 1D is converted to the weight applied to these suspension cylinders when the vehicle body is level. This conversion can be made by multiplying the weight values by a front wheel tilt correction factor PF ($\theta$) and a rear wheel tilt correction factor PR ($\theta$) corresponding to the longitudinal tilt angle $\theta$ (positive value when front part is elevated) of the vehicle body.

With respect to the transverse tilting of the vehicle body, the weights applied to these suspension cylinders can almost be compensated for by adding the weights applied to the left and right suspension cylinders for both the front and rear wheel suspension cylinders.

Figure 5:
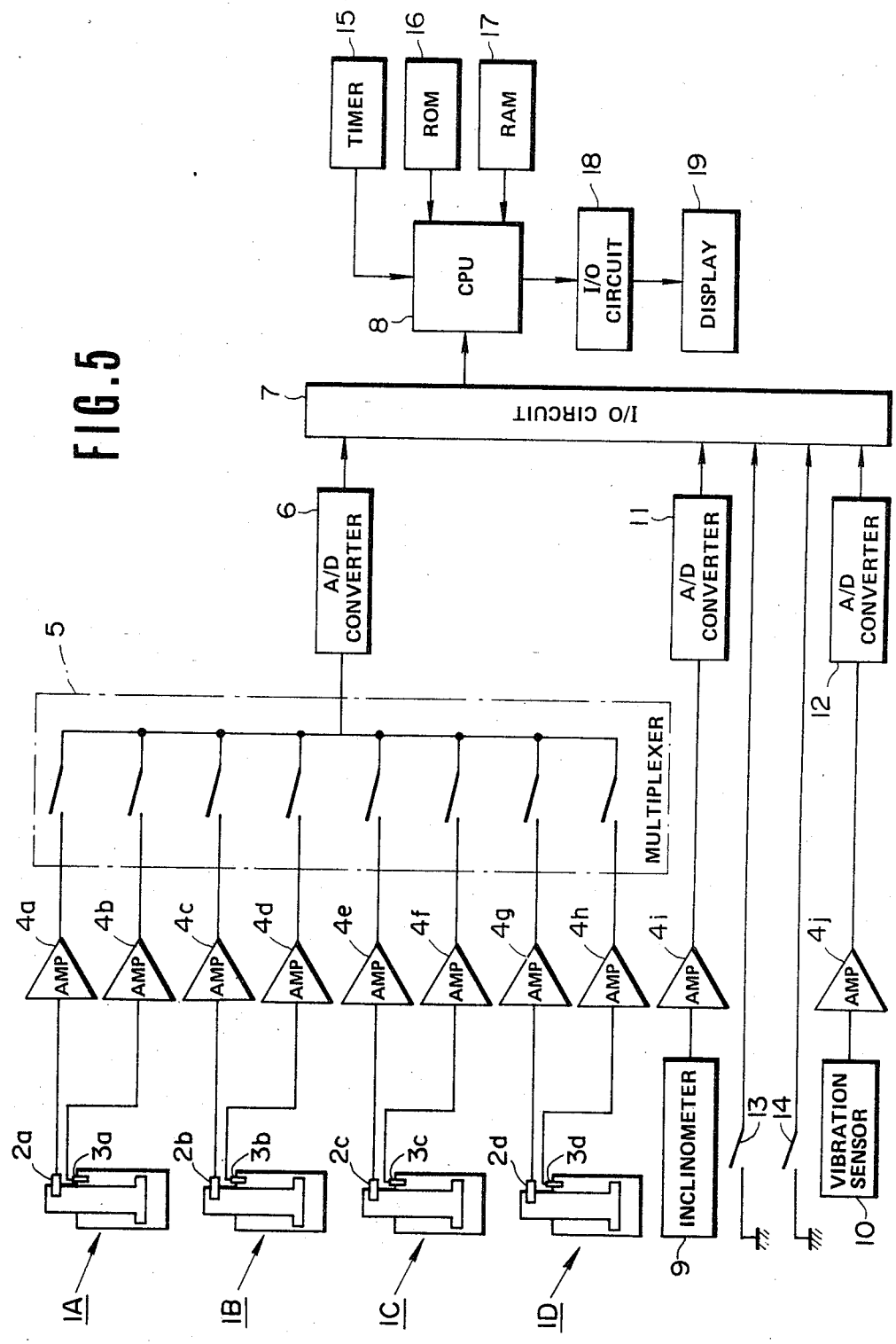
FIG. 5 is a block diagram showing an embodiment of the system for implementing the method of the present invention.

FIG. 5 is a block diagram showing an embodiment of the system for implementing the measuring method of load weight of a vehicle according to the present invention, in which there are provided pressure sensors 2a–2d for detecting the bottom pressure PB and pressure sensors 3a–3d for detecting the top pressure PT in each of four suspension cylinders 1A, 1B, 1C and 1D. Output signals of these eight pressure sensors are amplified at amplifiers 4a to 4h respectively, and are fed to a multiplexer 5. The multiplexer 5 selects input signals sequentially. Signals thus selected are converted to digital signals at an A/D converter 6, and fetched to a central processing unit (CPU) 8 via an input/output (I/O) circuit 7.

An inclinometer 9 is for detecting a tilt angle of the vehicle body in the longitudinal direction with respect to the level condition of the vehicle body. An oscillation sensor 10 is for detecting vertical vibration of the vehicle body. Each detected signal is amplified at an amplifier 4i or an amplifier 4j, converted to a digital signal at an analog-to-digital (A/D) converter 11 or an A/D converter 12, and fetched to the CPU 8 via the I/O circuit 7.

A calibration switch 13 is for starting the measurement of the weight of an empty vehicle. A parking switch 14 is a switch for detecting that the vehicle is in the parking condition. ON/OFF condition of each switch is fetched to the CPU 8 via the I/O circuit 7.

A timer 15 is for notifying the CPU 8 of a lapse of time. A read-only memory (ROM) 16 stores programs that the CPU 8 executes, the cross-sectional area SB of the suspension cylinder, the cross-sectional area ST of the piston cylinder, the front and rear wheel tilt correction factors corresponding to the vehicle body tilt angle, etc. The front and rear wheel tilt correction factors should be obtained in advance by tilt tests of the vehicle body.

A random access memory (RAM) 17 is for storing such data as the bottom pressure PB of the suspension cylinder, top pressure PT, and tilt angle $\theta$ from time to time, and numerical values during arithmetic operation.

As mentioned later, the CPU 8 processes various input data through arithmetic operation according to programs, outputs data indicating calculated load weight to a display 19 via the I/O circuit 18, and causes the load weight to be displayed.

Now, a typical processing procedure which the CPU 8 executes will be described in reference to flowcharts shown in FIG. 6 and FIG. 7.

Figure 6:
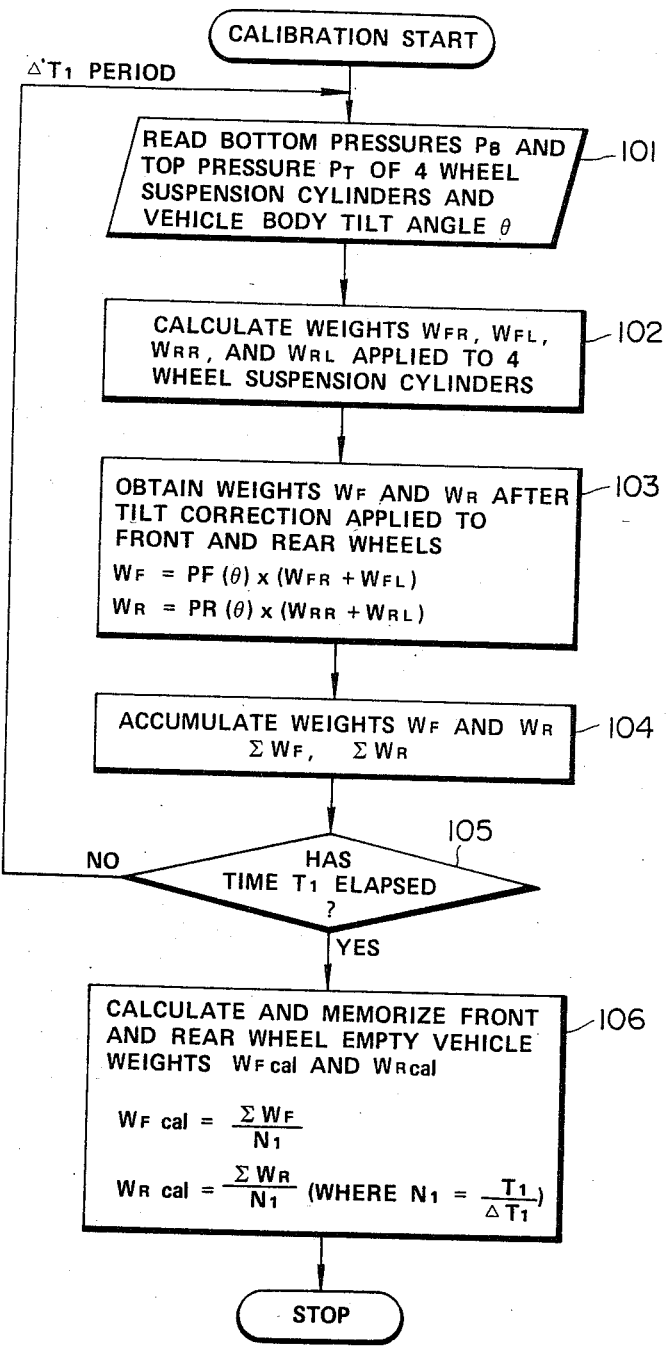
FIG. 6 and FIG. 7 are flowcharts used for explaining an embodiment of the method of the present invention.

FIG. 6 is a flowchart showing a processing procedure for measuring and memorizing the weight of empty vehicle. For calibration, the vehicle without load is run nearly at a constant speed in which a calibration switch 13 is pressed while the vehicle is running. The vehicle is run at a constant speed for the measuring the period of $T_1$. During the run, the vehicle body makes some vertical movement at its natural frequency, i.e., the four suspension cylinders 1A, 1B, 1C, and 1D repeat elongation and contraction.

Firstly, the bottom pressures PB and top pressure PT of the suspension cylinders 1A, 1B, 1C, and 1D of four wheels are read, and the longitudinal tilt angle $\theta$ of the vehicle body is read (step 101). Then, apparent weights WFR, WFL, WRR, and WRL applied to the suspension cylinders 1A, 1B, 1C, and 1D of the four wheels are calculated based on equation (2) (step 102). WFR, WFL, WRR, and WRL are the apparent weights applied to the front wheel right suspension cylinder, the front wheel left suspension cylinder, the rear wheel right suspension cylinder, and the rear wheel left suspension cylinder, respectively.

Then, based on the front wheel tilt correction factor PF ($\theta$) and the rear wheel tilt correction factor PR ($\theta$) read out from the ROM 16 by the vechile body tilt angle $\theta$, the following equations are calculated, and a weight WF applied to the two front wheels converted to the weight when the vehicle body is in the level condition and a weight SR applied to the two rear wheels converted to the weight in the level condition are obtained (step 103)

$$WR = PF(\theta) \times (WFR + WFL) \quad (6)$$
$$WR = PR(\theta) \times (WRR + WRL)$$

The weights WF and WR obtained at every period $T_1$ are accumulated respectively (step 104). Then, whether a predetermined time $T_1$ has elapsed since the calibration switch 13 was turned on is judged (step 105). When the time $T_1$ has not elapsed, the above processing is continued at the period of $\Delta T_1$, and after a lapse of $T_1$ the operation proceeds to the next step 106.

In step 106, the accumulated weights $\Sigma WF$ and $\Sigma WR$ applied to the front wheels and the rear wheels respectively are divided by the number of times $N_1 (=T_1/T)$ of accumulation, and empty vehicle weights WFcal and WRcal applied to the front wheels and the rear wheels are calculated and stored in the RAM 17.

The calibration ends with storing the empty vehicle weights WFcal and WRcal and WRcal in the RAM 17. Although empty vehicle weights WFcal and WRcal can be known in advance in the design stage of a vehicle, since options are added as required, measuring the empty vehicle weight according to the aforementioned method is preferable. The measurement of the empty vehicle weight is not necessarily performed each time the load weight is measured.

Figure 7:
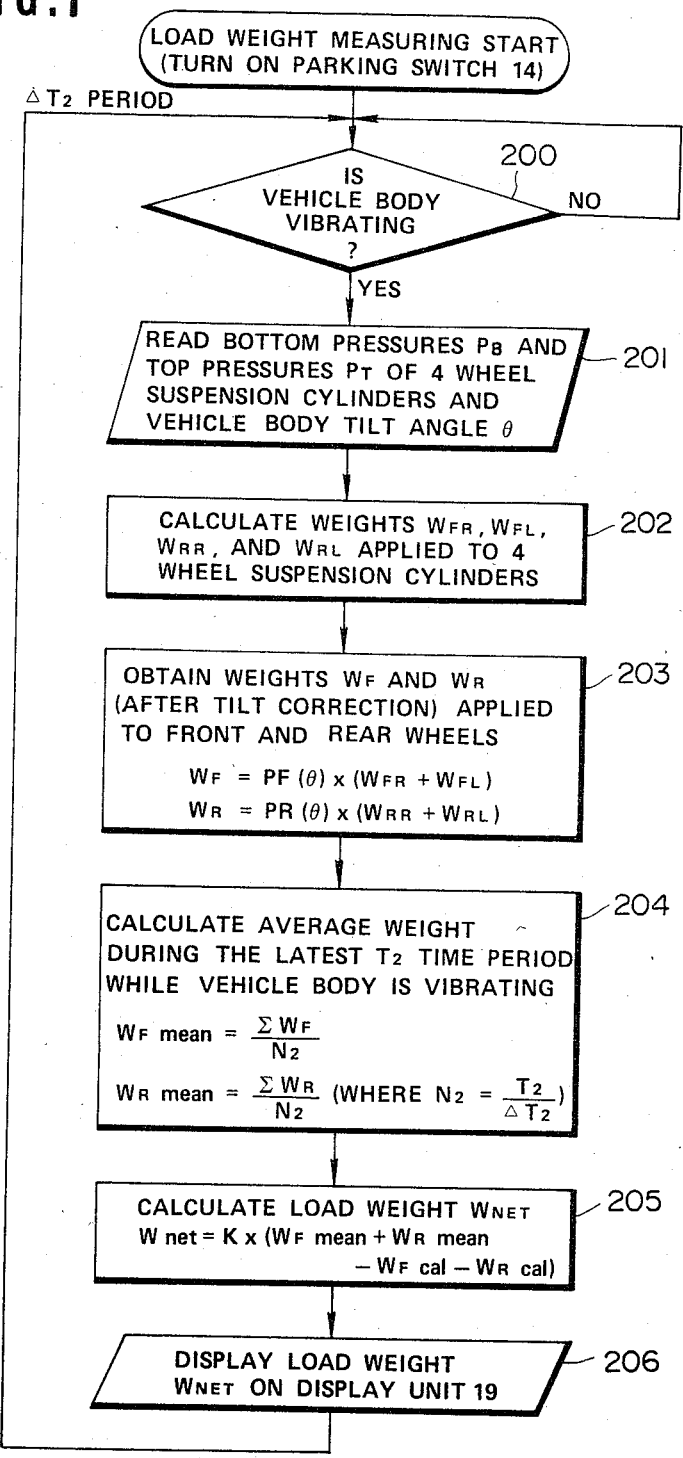

FIG. 7 is a flowchart showing the procedure for measuring and displaying the load weight after the empty vehicle weight was measured and stored. Referring to FIG. 7, to start the measurement of the load weight, a parking switch 14 is turned on. This is necessary because the load weight must be measured while a cargo is being loaded, i.e., while the vehicle is in parking. This is because even if the load weight is measured accurately utilizing vibration during the running period of the vehicle like the measurement of the empty vehicle mentioned previously, when the load weight is far above or far below the maximum load weight, proper action cannot be taken. On the other hand, when a loader is used for loading, since it is controlled so that the load weight becomes to a proper level (four or five bucketfuls of material usually), the vehicle vibrates during loading even when the vehicle is parked. This vibration decreases and then stops in 5 to 10 seconds.

After the load weight measuring started, whether or not the vehicle body is vibrating is judged (step 200). This judgment is made based on whether or not the signal from the vibration sensor 10 exceeds a threshold value corresponding which is determined based on the amplitude of the vibration sufficient to cause the suspension cylinder to make telescopic action.

When the vehicle body is vibrating, the operation proceeds to steps 201, 202, and 203. Since these steps 201, 202, and 203 are same as steps 101, 102, and 103 of FIG. 6, the description is omitted.

Then, in step 204, mean weights WFmean and WRmean applied to the front and rear wheels at the latest time period $T_2$ when the vehicle body is vibrating are calculated by the following equations:

$$\left. \begin{array}{l} WF\text{mean} = \dfrac{\Sigma WF}{N_2} \\ WR\text{mean} = \dfrac{\Sigma WR}{N_2} \end{array} \right\} \quad (7)$$

where $N_2$ is a value obtained by dividing the time period $T_2$ by a sampling period $\Delta T_2$. $N_2$ is a constant. $\Sigma WF$ and $\Sigma WR$ are sums of weights WF and WR fetched every $\Delta T_2$ period. The summation is carried out as many as $N_2$ times. The latest weight WF and WR in the time period $T_2$ are added, and the oldest weights WF and WR are subtracted. That is, the mean weights WFmean and WRmean are updated every $\Delta T_2$ period.

Then, the load weight Wnet is calculated by the following equation (step 205) based on the mean weights WFmean and WRmean thus obtained and the empty weights measured and memorized as described in FIG. 6.

$$W\text{net} = K \times (WF\text{mean} + WR\text{mean} - WF\text{cal} - WR\text{cal}) \quad (8)$$

where K is a proportional constant.

The load weight Wnet thus obtained is displayed on the display 19 (step 206).

Although the embodiment is adapted to perform both empty vehicle weight measurement and loaded vehicle weight measurement while the vehicle body is vibrating (i.e., during run or loading), measuring either one of vehicle weights in the above-described manner will improve the measurement accuracy of the load weight compared with conventional methods.

What is claimed is:

1. A load weight measuring method wherein a load weight is measured by subtracting the weight of a vehicle body when it is empty from the weight when it is loaded, said vehicle body being carried by all suspension cylinders of a vehicle comprising the steps of:

sequentially detecting pressures in said all suspension cylinders during a predetermined duration of time while the vehicle is vibrating;

calculating a weight applied to said all suspension cylinders based on the detected pressure and the cross-sectional area of each cylinder; and calculating an average value of the calculated weight during said predetermined duration of time, thereby measuring at least either one of the weight when the vehicle is loaded or the weight when the vehicle is empty.

2. The load weight measuring method of claim 1 wherein said suspension cylinder is a hydropneumatic suspension having spring and damping properties and being provided for each wheel of the vehicle.

3. The load weight measuring method of claim 1 wherein the weight W' applied to said suspension cylinder is calculated by the equation $$W' = PB \times SB - Pt(SB - ST)$$

where PB: bottom pressure of said suspension cylinder
PT: top pressure of said suspension cylinder
SB: cross-sectional area of said suspension cylinder
ST: cross-sectional area of a piston cylinder of said suspension cylinder.

4. The load weight measuring method of claim 1 wherein in calculating the weight applied to said all suspension cylinders, the longitudinal tilt angle of the vehicle is detected, and the weight applied to the front wheel suspension cylinders and the weight applied to the rear wheel suspension cylinder are multiplied by a front wheel tilt correction factor and a rear wheel tilt correction factor each corresponding to said detected tilt angle respectively so as to convert to weights applied to said suspension cylinders when the vehicle is in level state.

5. The load weight measuring method of claim 4 wherein said front and rear wheel tilt correction factors corresponding to said vehicle tilt angle are obtained in advance through vehicle tilt tests.

* * * * *